2,790,805

AMINO-HALOGENODICYANOPYRIDINES AND THEIR PREPARATION

Ernest Lewis Little, Jr., and William Joseph Middleton, Wilmington, Del., assignors to E. I. du Pont de Nemours and Company, Wilmington, Del., a corporation of Delaware No Drawing. Application April 15, 1955, Serial No. 501,714

10 Claims. (Cl. 260—294.9)

This invention is concerned with a new class of heterocyclic compounds, and more particularly with amino-halogenodicyanopyridines and their preparation.

It is an object of this invention to provide a new class of useful organic compounds and a process for their preparation. Other objects will become apparent from the following specification and claims.

There has now been discovered the process of reacting a member of the class of α,γ-dicyanoglutaconodinitriles (1,1,3,3-tetracyanopropenes) with hydrogen halides, preferably in the presence of an inert liquid diluent and in the absence of water, to yield a new class of chemical compounds, the 2-amino-6-halogeno-3,5-dicyanopyridines. The α,γ-dicyanoglutaconodinitriles consist of the unsubstituted compound corresponding to the class name and the β-substituted compounds. These compounds may be added directly in the process, or a salt of any of these compounds can be used instead, as the α,γ-dicyanoglutaconodinitriles are formed in situ from their salts in the presence of hydrogen halides. Similarly, a compound which will release hydrogen halide under the reaction conditions can be used instead of adding hydrogen halide directly for the reaction. This is illustrated in Example I. Accordingly reference hereinafter to reactants taking part in the critical step of this invention is not limitative as to the actual starting materials used in the process to provide these reactants unless so specified.

In the reaction one of the nitrogen atoms from the glutaconodinitrile enters the pyridine ring and the other emerges as an amino group on a carbon atom adjacent to the ring nitrogen, the other carbon atom adjacent to the ring nitrogen carrying the halogen from the reacting hydrogen halide. This reaction and the new class of pyridines formed may be represented by the following formulae.

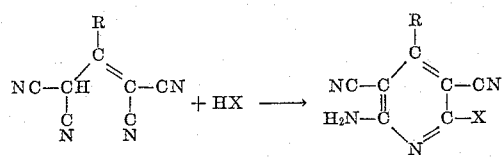

where X is halogen, and R is hydrogen or a nucleophilic or electrophilic substituent, particularly cyano, dicyanomethyl, amino, halogen, hydroxyl, lower alkyl, phenyl, lower alkoxy, phenoxy, lower alkylthio, phenylthio, lower alkylsulfinyl, phenylsulfinyl, lower alkylsulfonyl or phenylsulfonyl.

It has been found that, when a β-substituted α,γ-dicyanoglutaconodinitrile is reacted with a hydrogen halide at temperatures below about 50° C., a 4-substituted 2-amino-6-halogeno-3,5-dicyanopyridine is formed in the presence of water as illustrated in Example V. However, in order to avoid the loss of reactants through the formation of 2,6-dihydroxypyridine by-products, it is preferred to carry out the reaction in the absence of water.

In a preferred embodiment of this invention, dry hydrogen chloride gas is bubbled into a solution of an α,γ-dicyanoglutaconodinitrile in an inert liquid diluent at 0° C. until at least one mole of hydrogen chloride per mole of glutaconodinitrile has been added. The resulting solution is warmed to room temperature and allowed to stand for 48 hours, during which time crystals of a 2-amino-6-chloro-3,5-dicyanopyridine slowly form as a precipitate. This precipitate is recovered by filtration. The 2-amino-6-chloro-3,5-dicyanopyridine may be purified if desired by sublimation or by recrystallization from a mixture of alcohol and water.

In the following examples parts are by weight.

Example I

Ninety-one parts of the hydrated sodium salt of 1,1,3,3-tetracyanopropene (Na[(NC)₂C=CH—C(CN)₂]·H₂O, Y. Urushibara, Bull. Chem. Soc. Japan 2, 278 (1927)) is dissolved in 3552 parts of tetrahydrofuran, and 60 parts of thionyl chloride is slowly added. The thionyl chloride reacts with the hydrated sodium salt to release tetracyanopropene and hydrogen chloride. A white crystalline precipitate (31 parts of sodium chloride) forms. After two hours the reaction mixture is filtered, and 1980 parts of hexane is added to the filtrate. 2-amino-6-chloro-3,5-dicyanopyridine separates as a white precipitate (42 parts). This material is purified by sublimation at 160° C. An additional 40 parts of 2-amino-6-chloro-3,5-dicyanopyridine is recovered from the tetrahydrofuran/hexane solution.

Anal.—Calcd. for $C_7H_3N_4Cl$: C, 47.10; N, 31.4; H, 1.68; Cl, 19.9. Found: C, 47.20; N, 31.73, 31.20; H, 1.91; Cl, 19.82.

Example II

A solution of 91 parts of the sodium salt of 1,1,3,3-tetracyanopropene in 3960 parts of acetone is saturated with hydrogen chloride by passing in an excess of the gas during a period of 20 minutes. A precipitate of 29 parts of sodium chloride forms and is removed by filtration. The filtrate is allowed to stand at room temperature for two days, during which time 85 parts of 2-amino-6-chloro-3,5-dicyano-pyridine slowly precipitates. It is separated by filtration. The white crystalline solid sublimes without melting at 200° C.

Anal.—Calcd. for $C_7H_3N_4Cl$: C, 47.10; N, 31.4; H, 1.68; Cl, 19.9. Found: C, 47.20; N, 31.55; H, 1.90; Cl, 19.84.

Example III

A solution of 91 parts of the sodium salt of 1,1,3,3-tetracyanopropene in 3960 parts of acetone is saturated with hydrogen bromide by passing in an excess of the gas during a period of 20 minutes. A white precipitate forms and is separated by filtration. The precipitate weighs 110 parts. It is washed with water, and 51 parts of sodium bromide is dissolved and removed, leaving 59 parts of 2 - amino - 6 - bromo - 3,5 - dicyanopyridine. The filtrate from the original separation is allowed to stand for two days, during which time an additional 45 parts of 2 - amino - 6 - bromo - 3,5 - dicyanopyridine crystallizes out. This white crystalline precipitate sublimes without melting at about 200° C.

Anal.—Calcd. for $C_7H_3N_4Br$: C, 37.75; N, 25.10; H, 1.34; Br, 35.80; M. W., 223. Found: C, 37.90, 38.12; N, 24.89, 24.96; H, 1.57, 1.56; Br, 35.57; M. W., 170, 196, 183.

Example IV

The sodium salt of 2-ethoxy-1,1,3,3-tetracyanopropene for use in this example is synthesized as follows: To a refluxing solution of 33 parts of malononitrile in 600 parts of chloroform, 70 parts of sulfur monochloride is added slowly over a period of six hours. The mixture is refluxed for 20 hours, and the chloroform is boiled off by heating on a steam bath. During the latter stages of this evaporation there is evidence of an exothermic reaction, and some crystalline material is deposited on the walls of the container. This deposit is combined with the residue from the evaporation and extracted exhaustively with diethyl ether in a Soxhlet extractor. The ether extract is evaporated to obtain 18 parts of crude tetracyanoethylene, which is purified by sublimation at 100° C. under reduced pressure (1-2 mm.).

Tetracyanoethylene is reacted with ethyl alcohol by dissolving 64 parts of tetracyanoethylene and 30 parts of urea (catalyst) in 395 parts of ethyl alcohol and heating the resulting solution at reflux until the initial deep purple color fades to a yellow. The solution is cooled and poured into 5000 parts of cold water. Dicyanoketene diethylacetal (60 parts) separates as an oil which solidifies on standing. It is purified by recrystallization from a mixture of alcohol and water.

Dicyanoketene diethylacetal (554 parts) is added to a solution of sodiomalononitrile prepared by dissolving 77 parts of sodium in 3946 parts of absolute ethyl alcohol and adding 220 parts of malononitrile. As the solid dissolves, the solution becomes warm. The white precipitate which forms upon cooling is collected on a filter, washed with ether, and recrystallized from alcohol. There is obtained 450 parts of the sodium salt of 2-ethoxy-1,1,3,3-tetracyanopropene in the form of white needles which melt above 300° C.

A solution of 104 parts of the sodium salt of 2-ethoxy-1,1,3,3-tetracyanopropene in 2376 parts of acetone is saturated with dry hydrogen chloride by passing in an excess of the gas over a 20-minute period. Sodium chloride (29 parts) precipitates and is separated by filtration. The filtrate is allowed to stand overnight, and 85 parts of 2-amino-6-chloro-3,5-dicyano-4-ethoxypyridine crystallizes out. This white crystalline solid starts to sublime at 175° C. and melts at 264-265° C.

*Anal.*—Calcd. for $C_9H_7N_4OCl$: C, 48.5; H, 3.14; N, 25.10; Cl, 15.99. Found: C, 48.80, 48.84; H, 3.14, 2.94; N, 25.10, 25.11; Cl, 16,19.

*Example V*

A solution of pyridinium pentacyanopropenide

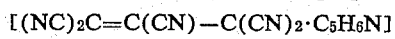

is prepared by adding a solution of 393 parts of pyridine in 600 parts of water to a solution of 640 parts of tetracyanoethylene in 1980 parts of acetone (cooled to —25° C.). The mixture is allowed to warm slowly to room temperature. It is not necessary to isolate the pyridinium pentacyanopropenide which is formed in this solution. The mixture is saturated with hydrogen chloride by passing in the anhydrous gas. The mixture is then cooled to 0° C., and 5000 parts of cold water are added. The light yellow precipitate which forms is collected on a filter, washed with water and dried. The product is recrystallized from a mixture of alcohol and water to yield 450 parts of 2-amino-6-chloro-3,4,5-tricyanopyridine in the form of pale yellow needles melting at 228-229° C.

*Anal.*—Calcd. for $C_8H_2N_5Cl$: C, 47.19; H, 0.99; N, 34.40; Cl, 17.42. Found: C, 47.50; H, 1.09; N, 34.45, 34.60; Cl, 17.27.

Example V is repeated up to the point of the addition of hydrogen chloride. Instead of using the dry gas, 590 parts of 36% aqueous hydrochloric acid is added. The mixture is heated at reflux for 10 minutes and then cooled to 0° C. The yellow precipitate which forms is collected on a filter, washer with water, and recrystallized from a mixture of alcohol and water to yield 330 parts of 2-amino-6-chloro-3,4,5-tricyanopyridine in the form of pale yellow needles melting at 228-229° C.

*Example VI*

A solution of pyridinium pentacyanopropenide in acetone is passed through an ion-exchange column in acid form (Amberlite IR-120-H) which has been rendered acid with aqueous acid, washed thoroughly with water and flushed with acetone to remove part of the water. The material is washed through with additional quantities of acetone. The acetone percolate is evaporated to dryness under nitrogen to obtain 1,1,2,3,3-pentacyanopropene dihydrate in the form of a crystalline solid melting at 65-70° C.

The water of hydration in 1,1,2,3,3-pentacyanopropene dihydrate is removed by dissolving 25 parts of the dihydrate in 180 parts of diethyl ether and drying the solution above anhydrous magnesium sulfate. The resulting ether solution of 1,1,2,3,3-pentacyanopropene is separated by filtration, and 395 parts of ethyl alcohol is added. The mixture is cooled to 0° C. and saturated with hydrogen chloride by passing in the dry gas. After standing overnight at room temperature, the solution is evaporated in a current of air. The yellow residue which remains is recrystallized from a mixture of alcohol and water to yield 13 parts of 2-amino-6-chloro-3,4,5-tricyanopyridine in the form of pale yellow needles melting at 218-222° C. The identity of this product with the product from Example V is established by the identity of their infrared absorption spectra.

*Example VII*

A solution of 280 parts of pentacyanopropene dihydrate in 1000 parts of water is mixed with a solution of 165 parts of tetramethylammonium chloride in 500 parts of water. The yellow precipitate which forms is collected by filtration, washed with cold water, and dried. It is recrystallized from water to yield 290 parts of the tetramethylammonium salt of 1,1,2,3,3-pentacyanopropene (tetramethylammonium 1,1,2,3,3-pentacyanopropenide) in the form of yellow needles melting at 314° C.

A solution of 180 parts of tetramethylammonium 1,1,-2,3,3-pentacyanopropenide in 792 parts of acetone is added to 1180 parts of 36% aqueous hydrochloric acid, and the mixture is boiled for 10 minutes. The solution is cooled, and the precipitate which separates is collected by filtration and recrystallized from a mixture of alcohol and water. There is obtained 110 parts of 2-amino-6-chloro-3,4,5-tricyanopyridine in the form of pale yellow needles melting at 227-228° C.

*Anal.*—Calcd. for $C_8H_2N_5Cl$: C, 47.19; H, 0.99; N, 34.40; Cl, 17.42. Found: C, 47.42; H, 1.16; N, 34.31, 34.45; Cl, 17.45.

*Example VIII*

To a solution of 200 parts of tetramethylammonium pentacyanopropenide in 950 parts of acetone is added 1790 parts of 48% hydrobromic acid, and the resulting solution is heated at reflux for 15 minutes. It is then cooled to room temperature, and the yellow precipitate which forms is collected by filtration and washed with water to yield 18 parts of crude 2-amino-6-bromo-3,4,5-tricyanopyridine. This product is purified by recrystallization from a mixture of alcohol and water to give pale yellow needles melting at 229-230° C.

*Anal.*—Calcd. for $C_8H_2N_5Br$: C, 38.73; H, 0.81; N, 28.24; Br, 32.32. Found: C, 38.72; H, 0.95; N, 28.31, 28.09; Br, 32.01.

*Example IX*

A solution of 39.3 parts of pyridine in 60 parts of water is added to a solution of 64 parts of tetracyanoethylene in 198 parts of acetone cooled to —30° C. The solution (containing pyridinium 1,1,2,3,3-pentacyanopropenide) is allowed to warm to room temperature, and 745 parts of 48% hydrobromic acid is added. The mixture is heated under reflux for 10 minutes and then cooled. The yellow solid which forms is collected by filtration, washed with water, and recrystallized from a mixture of alcohol and water to give 33 parts (65% yield of 2-amino-6-bromo-3,4,5-tricyanopyridine in the form of pale yellow needles melting at 229–230° C. The mixed melting point of this product with the product of Example VIII is not depressed.

Example X

N-methylpyridinium-1,1,2,3,3-pentacyanopropenide is prepared by mixing a solution of 130 parts of 1,1,2,3,3-pentacyanopropene dihydrate in 500 parts of water with a solution of 91 parts of N-methylpyridinium chloride in 1000 parts of water. The yellow precipitate of N-methylpyridinium 1,1,2,3,3-pentacyanopropenide which forms is collected by filtration and is recrystallized from water to yield 150 parts of yellow needles melting at 160–161° C.

To a solution of 150 parts of N-methylpyridinium pentacyanopropenide in 396 parts of acetone, there is added 1700 parts of 58% hydriodic acid, and the resulting solution is boiled for 5 minutes. The solution is cooled, and the precipitate which forms is collected by filtration, washed with water, and recrystallized from ethyl alcohol. There is obtained 200 parts of 2-amino-6-iodo-3,4,5-tricyanopyridine in the form of golden brown needles melting at 221–223° C.

Example XI

Tricyanovinylbenzene is prepared by heating a solution of 14,900 parts of benzoyl cyanide, 500 parts of malononitrile, 66 parts of piperidine, and 236 parts of acetic acid in 4,400 parts of benzene at reflux temperature. The water formed is removed by azeotropic distillation through a continuous water separator. After 41 hours the solution is cooled, washed with water, and dried over anhydrous magnesium sulfate. Benzene is removed by distillation at atmospheric pressure, and excess benzoyl cyanide is removed by distillation at reduced pressure. The residue of 2,060 parts of tricyanovinylbenzene is recrystallized three times from cyclohexane to give yellow needles melting at 97–99.5° C.

The sodium salt of 2-phenyl-1,1,3,3-tetracyanopropene is prepared by treating a suspension of sodiomalononitrile (prepared by adding 195 parts of malononitrile in 198 parts of ethanol to a solution of sodium ethoxide prepared from 68 parts of sodium and 946 parts of ethanol) with a solution containing 529 parts of tricyanovinylbenzene in 2370 parts of ethanol and 1500 parts of benzene. This addition is carried out at 0–5° C., and the mixture is stirred for one-half hour after addition is completed. Most of the solvent is removed at reduced pressure. Benzene is added to the remaining purple oil, and the solution is stored overnight at 5° C. The sodium salt of 2-phenyl-1,1,3,3-tetracyanopropene precipitates as a white crystalline solid which is separated by filtration, washed with benzene, and dried to yield 463 parts of product melting above 300° C.

To a solution of 240 parts of the sodium salt of 2-phenyl-1,1,3,3-tetracyanopropene in 2000 parts of water is added a solution of 110 parts of tetramethylammonium chloride in 1000 parts of water. The resulting suspension is heated, and water is added until a clear solution is obtained. Upon cooling this solution, the tetramethylammonium salt of 2-phenyl-1,1,3,3-tetracyanopropene is precipitated as colorless needles which are recrystallized from water and dried exhaustively at 125–130° C. under reduced pressure to yield the anhydrous salt in the form of colorless needles melting at 141–142° C.

A solution of 261 parts of the tetramethylammonium salt of 2-phenyl-1,1,3,3-tetracyanopropene in 2070 parts of dioxane is heated to boiling and stirred. Hydrogen chloride gas is bubbled into the solution, and an exothermic reaction occurs. The external heat source is removed, and hydrogen chloride is passed through the solution to keep it saturated with hydrogen chloride for an additional 4½ hours. This solution is diluted with 714 parts of ether, cooled, and the white precipitate is filtered and washed, first with cold ether, then with water and dried to yield 201 parts (87.6%) of 2-amino-6-chloro-3,5-dicyano-4-phenylpyridine, melting at 300–309° C. (with previous softening). Recrystallization from chloroform gives purified product in the form of a white crystalline solid melting at 303–308° C. with previous sublimation. The light absorption spectrum of a chloroform solution of this compound shows a maximum at 267 millimicrons (molecular extinction coefficient 27,900) with a secondary peak at 332 millimicrons (molecular extinction coefficient 7,290).

Anal.—Calcd. for $C_{13}H_7N_4Cl$: C, 61.3; H, 2.78; N, 22.0; Cl, 13.93; M. W., 255. Found: C, 60.88; H, 2.80; N, 22.06, 22.05; Cl, 14.55, 14.24; M. W., 230, 226.

The infrared absorption spectrum of this compound shows peaks at 2.95 microns and 3.1 microns indicative of an amino or an imino group. A band at 4.5 microns suggests the presence of a nitrile group. Bands at 13.15 microns and 14.2 microns indicate the presence of a mono-substituted aromatic ring.

Example XII

N,N-dimethyl-p-tricyanovinylaniline is prepared by heating a solution of 10 parts of tetracyanoethylene and 19.3 parts of N,N-dimethylaniline in 178 parts of tetrahydrofuran at reflux temperature for 5–10 minutes. Tetrahydrofuran is evaporated from the resulting deep blue solution, leaving 16 parts of N,N-dimethyl-p-tricyanovinylaniline in the form of a bright blue crystalline solid. It is purified by washing with ether and is recrystallized from ethyl alcohol.

A suspension of sodiomalononitrile in ethyl alcohol is prepared in an atmosphere of nitrogen by adding 232 parts of malononitrile in 237 parts of ethanol to a solution of sodium ethoxide, prepared from 81 parts of sodium and 1580 parts of ethanol. An additional 395 parts of ethanol is added, and the suspension is cooled to 2° C. A solution of 782 parts of N,N-dimethyl-p-tricyanovinylaniline in 9770 parts of tetrahydrofuran is added slowly over a period of 25 minutes. The solution is stirred for an additional hour at 5° C. and then for two hours at room temperature. The solvent is removed by distillation at reduced pressure yielding 1159 parts of the sodium salt of 2-(p-dimethylaminophenyl)-1,1,3,3-tetracyanopropene in the form of brown solid melting above 300° C.

A filtered solution of 283 parts of the sodium salt of 2-(p-dimethylaminophenyl)-1,1,3,3-tetracyanopropene in 5000 parts of water is stirred with a solution of 111 parts of tetramethylammonium chloride in 500 parts of water. The resulting solution is cooled, and the violet-colored precipitate which forms is separated by filtration, washed with cold water and dried to yield 193 parts (57.8%) of the crude tetramethylammonium salt of 2 - (p - dimethylaminophenyl) - 1,1,3,3 - tetracyanopropene. After recrystallization from ethanol, this product is obtained in the form of violet-colored plates melting at 233–238° C. with decomposition.

A suspension of 98 parts of the tetramethylammonium salt of 2-(p-dimethylaminophenyl)-1,1,3,3-tetracyanopropene in 5177 parts of dioxane is heated under reflux with stirring, while a stream of hydrogen chloride gas is bubbled through the solution. In a short time all of the starting material has dissolved, and a precipitate starts to form. After 2 hours the solution is cooled and diluted with 1070 parts of ether. The solid which precipitates is collected by filtration, washed with a cold 1:1 mixture of dioxane and ether, then washed with water and dried to give 75 parts (86%) of 2-amino-6-3,5-dicyano-4-(p-dimethylaminophenyl) pyridine. Recrystallization of this material from dimethylformamide gives a bright yellow solid melting above 320° C. The light absorption spectrum of a chloroform solution of this compound shows a maximum of absorption at 274 millimicrons (molecular extinction coefficient 22,800) with secondary peaks at 316 millimicrons (molecular extinction coefficient 12,440), and 396 millimicrons (molecular extinction coefficient 16,800).

Anal.—Calcd. for $C_{15}H_{12}N_5Cl$: C, 60.50; H, 4.06; N, 23.52; Cl, 11.91. Found: C, 60.72, 60.68; H, 4.30, 4.33; N, 23.62, 23.53; Cl. 11.98, 11.65.

The infrared absorption spectrum of this compound shows bands at 2.95 microns, 3.0 microns and 3.1 microns indicating an amino group, and at 4.5 microns and 4.6 microns indicating a nitrile group. Multiple bands in the 6–7 micron region indicate phenyl and pyridine unsaturation.

Example XIII

An aqueous solution of sodium 2-amino-1,1,3,3-tetracyanopropenide is prepared by heating under reflux for 20 hours a solution of 50 parts of sodium 2-ethoxy-1,1,3,3-tetracyanopropenide in 450 parts of concentrated ammonium hydroxide. N-methylquinolinium 2-amino-1,1,3,3-tetracyanopropenide is isolated as a precipitate when a molecular excess of N-methylquinolinium iodide is added to the solution of the sodium salt. After one recrystallization from water 50 parts of N-methylquinolinium 2-amino-1,1,3,3-tetracyanopropenide is obtained as light yellow, flat needles, M. P. 180–181° C.

A solution of 20 parts of N-methylquinolinium 2-amino-1,1,3,3-tetracyanopropenide in 373 parts of 48% hydrobromic acid is gently boiled for 5 minutes, cooled, and mixed with 250 parts of water. The light yellow precipitate which forms is collected on a filter, washed with water, and dried. There is obtained 13 parts of 2,4-diamino-3,5-dicyano-6-bromopyridine which is recrystallized from alcohol to give white micro-needles which sublime above 270° C.

Anal.—Calcd. for $C_7H_4N_5Br$: C, 35.31; H, 1.69; N, 29.42; Br, 33.57. Found: C, 35.60; H, 1.92; N, 28.60, 28.65; Br, 33.38.

When the sodium salt of 2-methyl-1,1,3,3-tetracyanopropene (Urushibara and Takebayashi, Bull. Chem. Soc. Japan, 11, 557–575) is substituted for the sodium salt of 1,1,3,3-tetracyanopropene in Example II, 2-amino-6-chloro-3,5-dicyano-4-methylpyridine is obtained. When hydrogen fluoride is employed in place of hydrogen chloride in this preparation, 2-amino-3,5-dicyano-6-fluoro-4-methylpyridine is obtained.

When dicyanoketene dimethyl thioacetal

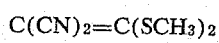

$$C(CN)_2=C(SCH_3)_2$$

(Edwards and Kendall, U. S. Patent No. 2,533,233) reacts with a single molecular equivalent of sodiomalononitrile in ethanol solution at room temperature, there is obtained the sodium salt of 2-methylmercapto-1,1,3,3-tetracyanopropene (sodium salt of α,γ-dicyano-β-methylmercaptoglutaconodinitrile). This compound is treated with anhydrous hydrogen chloride as in Example II, and there is obtained 2-amino-6-chloro-3,5-dicyano-4-methylmercaptopyridine. By careful oxidation of this compound with a single molecular equivalent of potassium permanganate, there is obtained 2-amino-6-chloro-3,5-dicyano-4-methylsulfinylpyridine. Further oxidation with permanganate yields 2-amino-6-chloro-3,5-dicyano-4-methylsulfonylpyridine.

When dicyanoketene dimethyl thiocetal reacts with two molecular equivalents of sodiomalononitrile in ethanol solution at room temperature, there is obtained the disodium salt of 2-dicyanomethylene-1,1,3,3-tetracyanopropane (sodium 2-dicyanomethylene-1,1,3,3-tetracyanopropane-1,3-diide). An acetone solution of this salt is saturated with hydrogen chloride, and there is obtained 2-amino-6-chloro-3,5-dicyano-4-dicyanomethylpyridine.

When cyanoacetyl chloride condenses with malononitrile, there is obtained 1,1,3-tricyanoacetone which in its enolic form, 2-hydroxy-1,1,3-tricyano-1-propene, is reacted first with sodium methylate and then with cyanogen bromide to yield the sodium salt of α,γ-dicyano-β-hydroxyglutaconodinitrile (sodium 2-hydroxy-1,1,3,3-tetracyanopropenide).

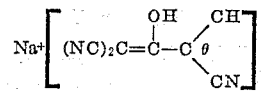

This compound is directly useful in the present invention because, when treated with anhydrous hydrogen chloride as in Example II, there is obtained 2-amino-6-chloro-3,5-dicyano-4-hydroxypyridine.

The sodium salt of α,γ-dicyano-β-hydroxyglutaconodinitrile is also useful for conversion to other starting materials for the present invention. For example, by carefully treating this compound with small portions of phosphorus tribromide until a single equivalent of phosphorus tribromide has been added, there is obtained the sodium salt of β-bromo-α,γ-dicyanoglutaconodinitrile. This compound is treated with anhydrous hydrogen chloride as in Example II to yield 2-amino-4-bromo-6-chloro-3,5-dicyanopyridine. Alternatively β-bromo-α,γ-dicyanoglutaconodinitrile is reacted with the sodium salt of phenol to yield the sodium salt of α,γ-dicyano-β-phenoxyglutaconodinitrile which, when treated with hydrogen chloride as in the process of Example II, yields 2-amino-6-chloro-3,5-dicyano-4-phenoxypyridine.

When the sodium salt of β-bromo-α,γ-dicyanoglutaconodinitrile is reacted with the sodium salt of thiophenol, the sodium salt of α,γ-dicyano-β-phenylthioglutaconodinitrile is obtained which, when treated with anhydrous hydrogen chloride, yields 2-amino-6-chloro-3,5-dicyano-4-phenylthiopyridine. By careful oxidation of this compound with a single molecular equivalent of potassium permanganate, there is obtained 2-amino-6-chloro-3,5-dicyano-4-phenylsulfinylpyridine. Further oxidation with permanganate yields 2-amino-6-chloro-3,5-dicyano-4-phenylsulfonylpyridine.

The sodium salt of 2-ethoxy-1,1,3,3-tetracyanopropene is dissolved in concentrated aqueous ammonium hydroxide, and the mixture is boiled. There is obtained the sodium salt of 2-amino-1,1,3,3-tetracyanoproprene which, when treated with hydrogen chloride by the process of Example XII, yields 6-chloro-2,4-diamino-3,5-dicyanopyridine. When methylamine is used in place of ammonia in the reaction with 2-ethoxy-1,1,3,3-tetracyanopropene, 2-methylamino-1,1,3,3-tetracyanopropene is obtained which on treatment with hydrogen chloride yields 2-amino-6-chloro-3,5-dicyano-4-methylaminopyridine. By similar steps starting with piperidine, 2-piperidino-1,1,3,3-tretracyanopropene yields 2-amino-6-chloro-3,5-dicyano-4-piperidinopyridine.

The process of this invention takes place at ordinary temperature if sufficient time is allowed. When it is desired to hasten the completion of the reaction, the reactants may be heated at temperatures up to 100° C. Although the process may be operated at temperatures above 100° C., by employing a closed system capable of withstanding the autogenous pressure of the reactants, pressure is not a critical factor in the reaction.

The use of a liquid medium for carrying out the process of this invention is optional. For example, it is possible to carry out this process by passing anhydrous hydrogen chloride gas into a melt of a dicyanoglutaconodinitrile, in which case no added liquid is required. However, to provide for controlled dissipation of the heat of reaction, it is preferable to operate in the presence of a liquid diluent which is inert to the components of the reaction under the reaction conditions. The examples show the use of tetrahydrofuran, acetone, water, ether/alcohol mixtures and dioxane. Other suitable media comprise liquid hydrocarbons (both aliphatic and aromatic), carbon tetrachloride, bromobenzene, "Tetralin" (tetrahydronaphthalene) and the like. The diluent should ordinarily be inert to the aminohalogenodicyanopyridine product, as well as to the reactants, but can be selected for the purpose of reacting further to form a derivative of the product.

The products of the present invention fluoresce under the influence of X-rays. They are thus useful as fluorescing agents in fluoroscopic screens. For example, 2-amino-6-chloro-3,5-dicyanopyridine, 2-amino-6-bromo-3,5-dicyanopyridine and 2-amino-6-chloro-3,4,5-tricyanopyridine all fluoresce blue when exposed to X-rays. Gelatin dispersions of these compounds mounted on a transparent photographic film base are thus highly useful as fluoroscope screens for observing visually the relative opacity of objects placed between them and a source of X-rays.

The products of this invention are also useful as selective inhibitors of biological processes. For example, 2-amino-6-chloro-3,4,5-tricyanopyridine inhibits the adaptive formation of the "malic" enzyme of *Lactobacillus arabinosus*. The formation of this enzyme is shown by S. Kaufman et al., J. Biol. Chem., 192, 301 (1951).

Since many different embodiments of the invention may be made without departing from the spirit and scope thereof, it is to be understood that the invention is not limited by the specific illustrations except to the extent defined by the following claims.

What is claimed is:

1. A compound represented by the formula,

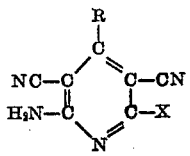

where X is a halogen and R is selected from the group consisting of hydrogen, cyano, dicyanomethyl, amino, halogen, hydroxyl, lower alkyl, phenyl, lower alkoxy, phenoxy, lower alkylthio, phenylthio, lower alkylsulfinyl, phenylsulfinyl, lower alkylsulfonyl and phenylsulfonyl.

2. 2-amino-6-halogeno-3,5-dicyanopyridine.
3. 2-amino-6-halogeno-3,5-dicyano-4-ethoxypyridine.
4. 2-amino-6-halogeno-3,4,5-tricyanopyridine.
5. 2-amino-6-halogeno-3,5-dicyano-4-phenylpyridine.
6. 2-amino-6 - halogeno-3,5 - dicyano-4 - (p - dimethylaminophenyl)-pyridine.
7. The process for preparing a 2-amino-6-halogeno-3,5-dicyanopyridine which comprises reacting an α,γ-dicyanoglutaconodinitrile with a hydrogen halide.
8. The process for preparing a 2-amino-6-halogeno-3,5-dicyanopyridine which comprises reacting an α,γ-dicyanoglutaconodinitrile with a hydrogen halide in the presence of an inert liquid diluent and in the absence of water.
9. A process as defined in claim 7 in which the reaction is conducted in the presence of a liquid diluent inert to the components of the reaction.
10. A process as defined in claim 7 in which the dicyanoglutaconodinitrile is formed in situ from its salt.

No references cited.